Dec. 27, 1927. 1,654,321
G. E. COLLINS
COMBINED POWER AND FOOT OPERATED VEHICLE BRAKE
Filed July 13, 1926
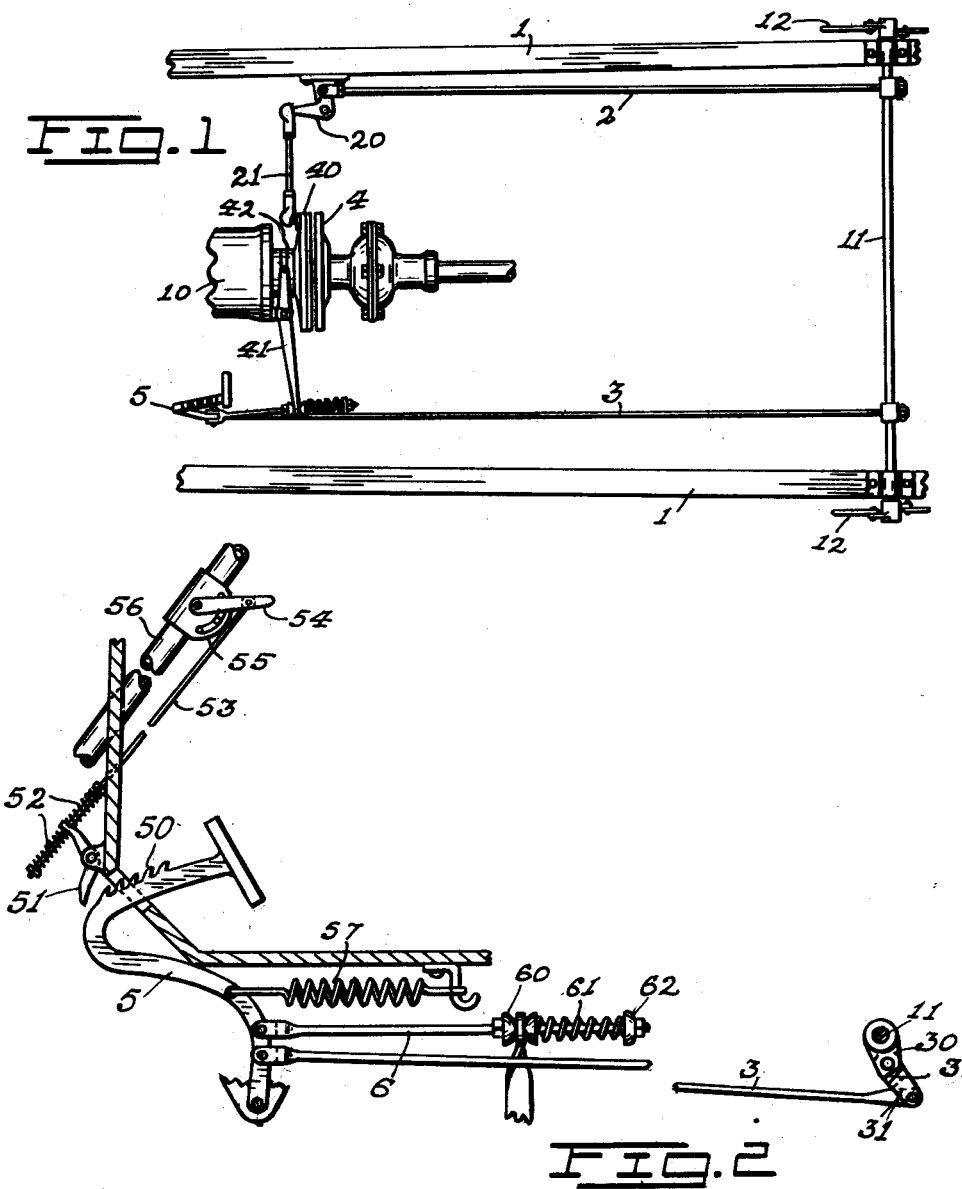
Inventor
*Guy E. Collins.*
By H. L. & C. L. Reynolds
Attorney Patented Dec. 27, 1927.

1,654,321

UNITED STATES PATENT OFFICE.

GUY E. COLLINS, OF SEATTLE, WASHINGTON, ASSIGNOR TO CHARLES W. COLLINS, OF SEATTLE, WASHINGTON.

COMBINED POWER AND FOOT OPERATED VEHICLE BRAKE.

Application filed July 13, 1926. Serial No. 122,063.

My invention relates to brakes for automobiles and to the means employed for operating them. It contemplates the use of both a power actuating means and a foot or hand operated means and connections whereby both may be applied by the actuation of a single lever, and in which the manually actuated means is applied only by the movement of said lever further than is required for the application of the power actuated means.

Another object is to provide means whereby, should the power brake actuating means fail in any of its parts, the manually actuating means may be immediately brought into action by a further movement of the same brake lever.

Briefly stated in general terms, my invention consists of so connecting a power actuated brake applying mechanism and a manually actuated brake applying mechanism with the same operating lever, that the power actuated brake applying mechanism may be used without using the manually actuated brake applying mechanism, and whereby the manually actuated brake applying mechanism may be operated from the same lever to utilize the same brake both as a service brake, and as a standing brake. It also consists of the details of apparatus whereby this result is secured.

The drawings accompanying show an installation of my invention.

Figure 1 shows a portion of a chassis frame and the brake actuating mechanism in plan view.

Figure 2 is a side elevation of the manually operated brake controlling lever and its associated parts.

The two bars 1, 1, represent the side bars of a chassis frame and 10 the rear end of the transmission casing of a typical automobile. Mounted upon these in any siutable manner is a transverse shaft 11 through which the power is transmitted to the brakes in any suitable manner. The construction of these parts illustrated is only shown as typical of standard construction, and any other suitable construction may be substituted therefor.

Each end of shaft 11 is provided with an arm or arms 12 which are in any suitable way connected with the arms upon which the brake band ends are mounted. The construction of these parts would vary with different constructions of brakes.

The rod 2 is connected by one end to a crank secured to shaft 11, and by its other end to a bell crank lever 20, the latter having a link 21 secured thereto and connecting it with a power actuated means by which the brake is applied. Such means as shown contemplates a disk 4 mounted to turn with the transmission shaft, a normally stationary disk 40 mounted to be oscillated upon the same axis and to which link 21 is secured, which two disks function as a friction clutch, by the axial movement of disk 40 through the action of the yoke lever 41 upon the grooved hub 42 of disk 40.

A rod 3 is also connected by one end to a crank arm secured upon shaft 11 and by its other end to the brake operating lever 5. The yoke lever 41 is connected with the same brake lever 5 by a rod 6. This connection preferably has a yielding feature incorporated therein, as by rod 6 passing through a hole in lever 41 and being provided with adjustable stops 60 and 62 and a spring 61, so that the force of the spring determines the normal force of application of the power device by which the brake is applied, and yet the brake lever may be caused to swing an additional distance, which is in the nature of an over-travel.

The connection of the rod 3 with the shaft 11 is of a nature such that its movement by the lever 5 is not such as to rock the shaft during that first part of the movement of the lever 5, which causes application of the power actuated brake. I have illustrated this as being secured by making the crank in two pivoted parts 30 and 31 having shoulders 32 which are engaged after a certain angle of swing has occurred.

The brake actuating foot lever 5 is provided with ratchet teeth 50, engageable by a dog 51 which is manually controlled to place it in or out of use by a rod 53 connected therewith, and with a hand operated lever 54 mounted in a convenient position, as upon the steering column 56 and held in adjusted position, as by an arc plate 55.

Two springs 52 are mounted upon the rod 53 at opposite sides of the folding dog 51. By securing lever 54 down spring 52 is compressed thereby holding the dog in lever engaging position. By securing lever 54 in upper position, the lower spring 52 acts upon the dog 51 to free it from teeth 50 of brake lever 5. If when so adjusted, after the dog has been engaged with the teeth on the brake lever, the dog will not be freed until the brake lever has been pressed down enough to free the dog. The dog may therefore be set so that it will hold the brake lever in set position and be freed by a slight further downward movement of the brake lever. The dog is designed to normally be held out of action.

By connecting a power actuated brake mechanism and a manually actuated brake mechanism in the manner illustrated, with a single brake applying or controlling lever, the power actuated means may be normally applied for service brake uses while the other connecting means may be used to apply the same brake for use as a standing brake or as a serivce brake in case anything went wrong with the means for applying the brake by power.

What I claim as my invention is:

1. A foot brake lever for automobiles having ratchet teeth thereon, a holding dog adapted to engage said teeth, a dog controlling rod and springs thereon engaging the dog, and means for adjusting the said rod to reverse the direction of action of said springs upon the dog.

2. The combination with a foot brake for automobiles, a holding dog adapted to hold said brake lever when depressed, a rod, an operating lever therefor and means for holding said operating lever in adjusted position, and springs carried by said rod and engaging said brake-lever-holding dog to urge said lever in respectively opposite directions under control of the adjusting means for said rod.

Signed at Seattle, King County, Washington, this 6th day of July, 1926.

GUY E. COLLINS.